Patented Dec. 20, 1949

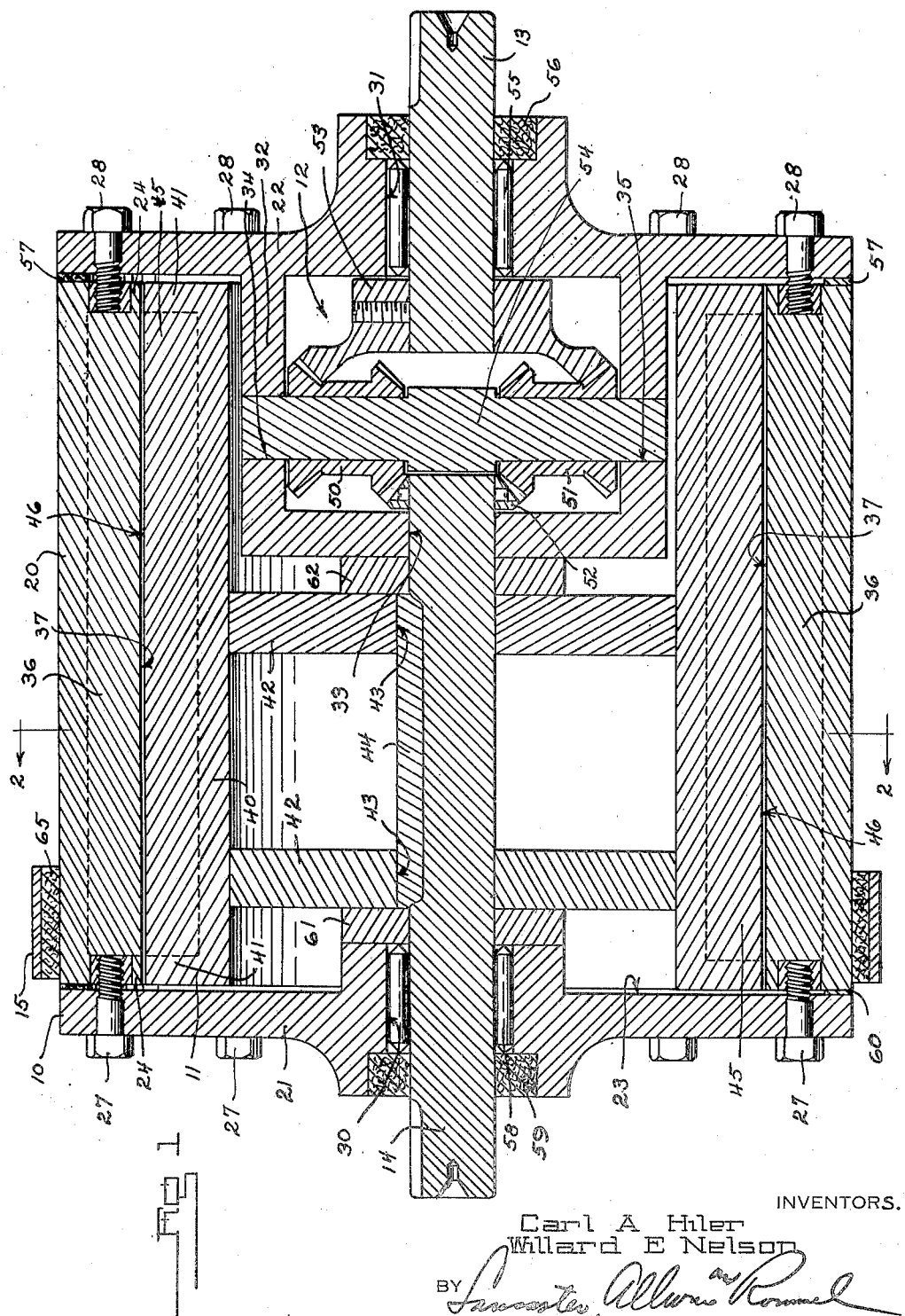

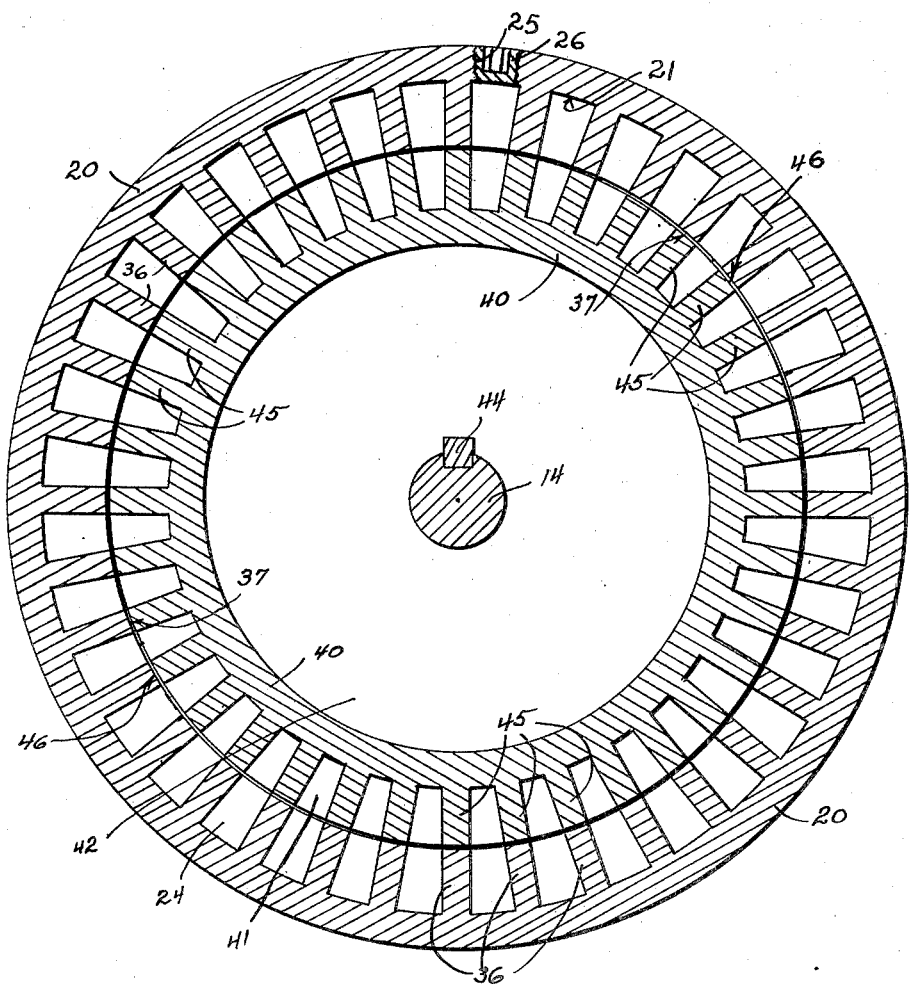

2,491,560

UNITED STATES PATENT OFFICE 2,491,560

FLUID DRIVE UNIT

Carl A. Hiler, Muskegon Heights, and Willard E. Nelson, Watervliet, Mich.

Application September 23, 1947, Serial No. 775,620

2 Claims. (Cl. 74—688)

This invention relates to fluid drive units.

An important object of the invention is to provide a new fluid clutch and associated gearing which will afford an efficient and quiet change from neutral to forward or reverse.

Another important object is to provide a novel fluid drive unit containing no springs nor like parts apt to become readily broken, nor associated parts the interaction of which causes excessive vibrations, sudden jerks, undesirable slippages of parts and the like.

Still another important object is to provide such a unit, comprising few parts and all the parts being of sturdy construction.

Another important object is to provide a particularly compact fluid drive unit.

Other objects and advantages of the invention will be apparent during the course of the following detailed description of the invention, taken in connection with the accompanying drawings, forming a part of this disclosure, and in which drawings:

Figure 1 is a longitudinal section of the novel drive unit.

Figure 2 is a transverse section, substantially on the line 2—2 of Figure 1.

In the drawings, wherein for the purpose of illustration is shown a preferred embodiment of the invention and wherein similar reference characters designate corresponding parts throughout the several views the novel fluid drive unit includes a rotatable housing or outer member 10 enclosing an impeller assembly or inner member 11 and gearing 12, and associated with which are a driven shaft 13 and drive shaft 14. There may also be provided brake means 15 for the rotatable housing 10.

The housing 10 comprises, in the example shown, an outer cylindrical wall 20, closed at one end by the end wall 21 and closed at the other end by the end wall 22, with the walls 20, 21 and 22 defining a chamber 23.

Extending inwardly from each end of the cylindrical wall 20 is a flange 24 and this wall may also be provided with a port 25, having a removable closure 26 so that the chamber 23 may be filled with and emptied of a suitable fluid for drive purposes.

Means 27 to detachably secure the end wall 21 to the cylindrical wall 20 at one flange 24 may be screws extending into the wall 21 and associated flange 24 and means 28 to similarly secure the end wall 22, may be screws extending into the wall 22 and associated flange 24.

The ends walls 21 and 22 are provided with shaft-receiving, axial openings 30 and 31 respectively, and one end wall (in the example shown, the end wall 22) has a gear housing 32 extending outwardly from its inner face, with the housing 32 provided with a substantially circular shaft opening 33 axially aligned with the openings 30 and 31, and two substantially circular openings 34 and 35, axially aligned and with their axes normal to the axes of the openings 30, 31 and 33.

Projecting radially from the inner face of the cylindrical wall 20 are a plurality of spaced-apart, longitudinally-extending, internal fins or impellers 36, as may be seen in Fig. 2. Preferably these fins are relatively narrow and have end faces 37. The fins preferably extend to the flanges 24 and are secured thereto, thus providing a triple attachment of each fin to the wall 20.

Rotatably carried by the housing 10 is the impeller assembly 11, which latter preferably comprises a cylindrical wall 40 (of course, inwardly of the cylindrical wall 20) open at both ends and provided with peripheral flanges 41 projecting outwardly from its two ends. The cylindrical wall 40 is supported by spaced-apart support members 42 provided with a keyway 43 for means 44 to key the impeller assembly 11 to the drive shaft 14.

Projecting outwardly from the periphery of the cylindrical wall 40 are a plurality of spaced-apart, longitudinally-extending fins or impellers 45 having end faces 46 constructed and arranged to clear the fins 36 but with the faces 37 and 46 providing a close tolerance. Like the fins 36, the fins 45 may be attached to the cylindrical wall 40 and to its flanges 41 as well.

Housed in the gear housing 32 is the gearing 12 which, in the example shown, comprises a pair of double pinion gears 50 and 51, a relatively small gear 52 and a relatively large gear 53. The two gears 50 and 51 are mounted, in spaced-apart relationship on a cross shaft 54 with the closest-adjacent pinions meshing with the gear 52 and the remote pinions of each double pinion gear meshing with the gear 53. The gear 52 is fixed to the end of the drive shaft 14 and the gear 53 is fixed to the end of the driven shaft 13. The shaft 54 extends into the aligning openings 34 and 35 in the gear housing wall, and the drive shaft 14 extends through the opening 33 for rotation therein.

The driven shaft 13 may be rotatably supported by suitable friction-reducing means, as roller bearings 55 carried in the end wall 22 and suitable packing 56 may also surround this shaft and be carried by the wall 22.

Between the flanges 24 and end walls 22 may be packing means, as a packing ring 57.

Likewise the drive shaft 14 may be rotatably supported by suitable friction-reducing means, as roller bearings 58 and be packed by suitable packing 59, both carried by the end wall 21.

Between the flanges 24 and end wall 21 may be disposed packing means, as a packing ring 60.

Spacing one support member 42 from the end wall 21 is a spacer 61 and spacing the other support member 42 from the gear housing 32 is a spacer 62.

Any suitable conventional braking means 15 may be provided, such as a brake band 65 encircling the outer cylindrical wall 20 and constructed and arranged to selectively grip and release this wall as is well known in the art.

With the unoccupied space in the chamber 23 supplied with a suitable fluid (as oil) rotation of the impeller assembly 11 will cause its fins 45 to force oil by centrifugal force against the sides of the fins 36 and rotate the housing 10.

When any suitable means (not shown) for rotation of the shaft 14 causes the shaft 14, its associated gear 52, and the impeller assembly 11 to rotate this causes, also, rotation of the gears 50 and 51, but permitting gear 53 and shaft 13 to remain idle only when motor or power means is running at a slow or idling speed, and the shaft 13 is held under load. The shaft 13 and its associate gear 53 remain idle until the motor speed is increased to the point where the centrifugal force of the fluid against the outer fins of the unit increases the torque to the extent where it moves the load. However, the cross shaft 54 will cause rotation of the gear housing 32 and, consequently, the housing 10, rotates at substantially half the speed of rotation of the impeller assembly 11, since there is a slippage afforded by the fluid.

Upon increasing the speed of the shaft 14 and parts secured thereto, the centrifugal force, as stated, decreases the slippage noted and, gradually, the housing 10 begins to increase its speed of rotation and this, in turn, causes the shaft 13 to begin rotation, in the same direction of rotation as that of the shaft 14. Eventually, the housing 10 and impeller assembly 11 will be rotating at the same speed, with the gear ratio changing with it and gradually decreasing from 1:2 to 1:1.

When the unit is idling or in neutral as stated, the brake means 15 may be employed to slow up and stop rotation of the housing 10. As is now apparent, the shaft 14 will be caused to rotate at low speed but it rotates the pinions 50 and 51 and they, in turn, rotate the gear 53 and shaft 13 in the opposite direction. This affords a reverse action, with a speed up to that which will be permitted by fluid slippage past the fins.

To summarize the operation, considering the ratios of the R. P. M.'s of the shafts 13 and 14, if the ratio of gears 50, 51, 52 and 53 were 4:1, cylinder 40 would rotate four times as fast as cylinder 20 (at idling speed) but when the speed is increased to the point where both cylinders 20 and 40 rotate together, the shafts 13 and 14, gears 50 to 53 will also rotate in unison with the cylinder 20 and its attached end walls 21 and 22 but the shafts 13 and 14 will not rotate with respect to their bearings 30 and 31 and gears 50 and 51 will not rotate on shaft 54. Thus, the entire assembly rotates as would a unit, and the R. P. M. of shaft 13 would be zero at idling speed and gradually pick up speed as the speed of shaft 14 increased, so that shaft 13 would eventually rotate at the same R. P. M. as shaft 14. Likewise, all the other members of the assembly will be rotating at the same R. P. M. and there will be no wear on the assembly, as when the outer cylinder 20 is rotating at the same speed as inner cylinder 40.

This novel fluid drive unit is particularly compact. For example, the gear housing 32 fits within the impeller assembly 11, thus reducing the overall length. It is light in weight, yet sturdy. For example, the fins or impellers 36 and 45 are attached at three edges to their respective members 10 and 11.

Various changes may be made to the form of the invention herein shown and described without departing from the spirit of the invention or scope of the claims.

What is claimed is:

1. In a fluid drive unit, an outer rotatable housing member having a side wall having inturned flanges at its ends and end walls through which extends the axis of rotation of said member, said walls defining a fluid chamber, and a plurality of fins projecting inwardly from said side wall and extending longitudinally of said member and rigid with said flanges; an open-ended impeller assembly member within said outer member having a cylindrical side wall having outwardly-projecting end flanges and fins projecting outwardly from said last-named side wall toward said first-named side wall and rigid with said last-named flanges, with the free ends of the second fins clearing said first fins and in close proximity thereto; a driven shaft extending into said housing member from one end wall thereof and rotatable independently of said housing member, a drive shaft extending into said housing member at the other end wall thereof and into said impeller assembly rotatable independently of said housing member; means securing said drive shaft to said impeller assembly member at the axis of rotation of the latter; a gear housing within and rigidly secured to said outer housing with the inner ends of both of said shafts extending into said gear housing, and gearing within said gear housing, including pinion gears, means including a cross shaft mounting said gears and carried by said gear housing with the longitudinal axis of said cross shaft normal to the axes of rotation of said drive and driven shafts, a drive gear meshing with said pinion gears and secured to said drive shaft, and a gear meshing with said pinion gears and secured to said driven shaft and being of a circumference greater than the circumference of said drive gear.

2. In a fluid drive unit, an outer rotatable housing member having a side wall having inturned flanges at its ends and end walls through which extends the axis of rotation of said member, said walls defining a fluid chamber, and a plurality of fins projecting inwardly from said side wall and extending longitudinally of said member and rigid with said flanges; an open-ended impeller assembly within said outer member having a side wall having outwardly-projecting end flanges and fins projecting outwardly from said last-named side wall toward said first-named side wall and rigid with said last-named flanges, with the free ends of said last fins clearing said first fins and in close proximity thereto, there being an equal number of first and last named fins; a driven shaft extending into said housing member from one end wall thereof and rotatable independently of said housing member, a drive shaft extending into said housing member at the other end wall thereof, rotatable independently of said housing member; means securing said drive shaft to said impeller assembly at the axis of rotation of the latter; a gear housing within and fixedly secured to said outer housing with the inner ends of both of said shafts extending into said gear housing, gearing means including a pair of spaced-apart pinion gears, means mounting said pinion gears within said gear housing to rotate on a common axis of rotation normal to the axes of rotation of said shafts, a drive gear mounted upon said drive shaft and meshing with said pinion gears, and a gear mounted upon said driven shaft and of a diameter length different from the diameter length of the drive gear and meshing with said pinion gears; and means to selectively permit and prevent rotation of said housing member.

CARL A. HILER.
WILLARD E. NELSON.

REFERENCES CITED

The following references are of record in the file of this patent:

UNITED STATES PATENTS

| Number | Name | Date |
| --- | --- | --- |
| 1,259,102 | Hutchinson | Mar. 12, 1918 |
| 1,476,458 | Murray | Dec. 4, 1923 |
| 2,198,398 | Szekely | Apr. 23, 1940 |
| 2,283,486 | Berry | May 19, 1942 |
| 2,337,609 | Jamieson | Dec. 28, 1943 |

FOREIGN PATENTS

| Number | Country | Date |
| --- | --- | --- |
| 775,744 | France | Oct. 15, 1934 |